United States Patent [19]

Naccache

[11] Patent Number: 5,452,357
[45] Date of Patent: Sep. 19, 1995

[54] METHOD AND APPARATUS FOR ACCESS CONTROL AND/OR IDENTIFICATION

[75] Inventor: David Naccache, Maisons-Alfort, France

[73] Assignee: Thomson Consumer Electronics S.A., Courbevoie, France

[21] Appl. No.: 400,310

[22] Filed: Mar. 6, 1995

Related U.S. Application Data

[63] Continuation of Ser. No. 94,931, Jul. 16, 1993, abandoned.

[30] Foreign Application Priority Data

Jan. 18, 1991 [FR] France ............................. 91 400111
Jan. 11, 1992 [FR] France ............................. 92 00044

[51] Int. Cl.⁶ ............................................. H04L 9/00
[52] U.S. Cl. .......................................... 380/25; 380/30
[58] Field of Search ...................... 380/23, 25, 28, 30

[56] References Cited

U.S. PATENT DOCUMENTS

| | | | |
|---|---|---|---|
| 4,354,201 | 10/1982 | Sechet et al. | 380/20 |
| 4,932,056 | 6/1990 | Shamir | 380/28 |
| 4,933,970 | 6/1990 | Shamir | 380/30 |
| 4,995,082 | 2/1991 | Schnorr | 380/23 |
| 5,204,901 | 4/1993 | Hershey et al. | 380/30 |
| 5,289,542 | 2/1994 | Kessler | 380/30 |

FOREIGN PATENT DOCUMENTS

| | | | |
|---|---|---|---|
| 0325238 | 7/1989 | European Pat. Off. | G07F 7/10 |
| 0383985 | 8/1990 | European Pat. Off. | H04L 9/00 |
| 0384475 | 8/1990 | European Pat. Off. | H04L 9/32 |
| 0389895 | 10/1990 | European Pat. Off. | H04L 9/32 |
| 0252499 | 10/1992 | European Pat. Off. | G07F 7/10 |
| FR80/00090 | 12/1980 | WIPO | H04N 7/16 |
| PCT/FR87/-00382 | 4/1988 | WIPO | G07F 7/08 |
| FR87/00382 | 4/1988 | WIPO | G07F 7/08 |
| PCT/US89/-01944 | 11/1989 | WIPO | G07F 7/10 |

OTHER PUBLICATIONS

Shamir et al., "An Improvement of the Fiat-Shamir Identification and Signature Scheme", Proceedings from CRYPTO '88, pp. 244–247, Mar. 21, 1990.

*Primary Examiner*—Salvatore Cangialosi
*Attorney, Agent, or Firm*—Joseph S. Tripoli; Peter M. Emanuel; Robert D. Shedd

[57] ABSTRACT

A system providing access control, including encryption and decryption capability, replaces a public key directory by a transmission between an authority, or a sender S, and a receiver R of a "seed" value. The seed is processed to provide both identity information for R and public keys, i.e. a "virtual public key directory", or VPKD. The VPKD is generated prior to execution of the algorithm requiring the public directory, i.e. the host algorithm.

28 Claims, 7 Drawing Sheets

METHOD AND APPARATUS FOR ACCESS CONTROL AND/OR IDENTIFICATION

This is a continuation of application Ser. No. 08/094,931, filed Jul. 16, 1993, now abandoned.

The present aplication is a continuation of International Patent Application Number PCT/EP92/00044 filed 11 Jan. 1992 by David Naccache and having the same title as the present application.

FIELD OF THE INVENTION

The present invention relates to a method and to an apparatus for access control and/or identification which requires no public key directory.

BACKGROUND

For many applications, e.g. smart cards for pay TV purposes, credit cards, passports, dongels, military command and control systems, unforgeable systems for access control or digital signature are required. Such access control and signature systems may include public keys. But in many public key identification and access control systems the key management becomes very complicated when the number of users increases. Typical problems are: 1) the memory size of the public directory; 2) interaction with the directory is needed whenever users want to communicate causing simultaneous access problems if the directory is not duplicated; 3) the "blacklisting" of invalid and old keys; 4) adding a new member (e.g. "allusers" update mail to the members); 5) risks of forgery of the public directory (e.g. interchange of public keys between an authorized user and an unauthorized party attempting to gain access). Entities might try to duplicate, playback, or forge key identification devices (hereafter called 'identifiers' because they identify authorized users).

A known solution to this problem of digital identification and signature is described in European Patent Applications EP 0252499 and EP 0325238 by Fiat and Shamir. This method utilizes a trusted authority which issues an identifier to each authorized user. No further interaction with any center is required. In particular, no interaction is required for either generating or verifying identities and signatures. An unlimited number of users can join the system without statistically compromising its security. Interactions with identifiers do not allow forgery of identifiers. No user or verifier directories are needed.

Although the known approach disclosed in, for example, EP 0252499 works well in many applications, certain theoretical aspects may result in compromised security. A brief summary of the protocol, i.e. the flow scheme, which is disclosed in EP 0252499 follows. In the following description, U is an user, e.g. a smart card;
V is a verifier;
k is an integer number, e.g. in the range [1,18];
r is a random integer number in the range [0,n);
$(e_1 e_2 e_3 \ldots e_k)$ is a binary vector.

In the known approach, an "authority" chooses a pseudo random function f and a modulus n=pq, where p and q are both prime numbers that are known only to the authority (A=B mod n is equivalent to mod (A,n)=mod (B,n)). To issue an identifier, the authority:

1) prepares a string ID containing information which is unique to the entity U;

2) computes a set of values $v_{ji} = f(ID, j_i)$ for small values of $j_i$;

3) selects k values of the $v_{ji}$ which are quadratic residues mod n and computes the values $s_{ji}$ such that $s_{ji}^2 * v_{ji} = 1 \mod n$;

4) issues an identifier containing ID, $j_1, j_2, \ldots, j_k, s_{j1}, s_{j2}, \ldots, s_{jk}$ and n.

The identity verification protocol between user U and verifier V then proceeds as follows:

1) U sends ID and $j_1, j_2, \ldots, i_k$ to V;
2) V generates the $v_{ji}$ by computing $v_{ji} = f(ID, j_i)$ for $i=1, 2, \ldots, k$;
3) U picks a random r and sends $r^2 \mod n$ to V;
4) V chooses a binary vector $(e_1 e_2 e_3 \ldots e_k)$ and sends it to U;
5) U multiplies r by each of the $s_{ji}$ values where bit $$y = r \prod_{ei=1} s_{ji} \mod n$$

(for example, if the binary vector is 1100100000, then $y = r * s_{j1} * s_{j2} * s_{j5} \mod n$);

V checks that $$r^2 = y^2 \prod_{ei=1} v_{ji} \mod n.$$

The security of the described protocol can be compromised in a number of ways. Three techniques, designated A, B, and C, are described below.

A) If an unauthorized user U attempts to gain access and discovers only one of the $s_{ji}$, e.g. $s_{jc}$, the system becomes vulnerable to the following scheme in which user U successfully misrepresents himself:

U sends ID and $j_c, j_c, \ldots, j_c$ to V;
V generates k times the sane $v_{jc}$ since all the $j_i$ are identical;
U picks a random r and sends $r^2 \mod n$ to V;
V chooses a binary vector $(e_1 e_2 e_3 \ldots e_k)$ and sends it to U;
U sends to V $$y = r \prod_{ei=1} s_{jc} = r s_{jc}^{(\Sigma e_i)} \mod n$$

V checks that $$r^2 = y^2 \prod_{ei=1} v_{ji} \mod n.$$

B) This approach is less difficult than "A" above because it is easier mathematically to compute the inverse of one of the $v_{ji}$, e.g. $v_{jc}^{-1}$, than it is to compute the inverse root $s_{jc}$. If such a value is known then the probability is 0.5 that the above-described known identification system can be compromised as follows:

U sends ID and $j_c, j_c, \ldots, j_c$ to V;
V generates k times the same $v_{jc}$ since all the $j_i$ are identical;
U picks a random r and sends $r^2 \mod n$ to V;
V chooses a binary vector $(e_1 e_2 e_3 \ldots e_k)$ and sends it to U;
U sends to V $y = r(v_{jc}^{-1})^{int(\Sigma e_i/2)} \mod n$;

V checks that $$r^2 = y^2 \prod_{ei=1} v_{ji} \bmod n.$$

This test will be true if $\Sigma e_i$ is even.

If a pay TV verifier is public and available in any desired quantity, an entity attempting to gain unauthorized access could use four verifiers simultaneously to obtain, for example, a TV program descrambled up to 94% by using approach B. If four additional verifiers are added, the percentage of descrambled TV content is increased to 99.6% which provides acceptable image quality.

C) The third approach, referred to as "signature forgery", is the most dangerous approach because it permits any verifier to forge signatures from only public data. Signature forgery proceeds as follows:

U sends ID and $j_c, j_c, \ldots, j_c$ to V;

V generates k times the same $v_{jc}$ since all the $j_i$ are identical;

U executes the following algorithm:

```
DO
  r = random ()
  (e₁e₂ ... eₖ) = f(r² mod n,m)
  α = Σei
}
WHILE (α is odd)
y = r* (v⁻¹_jc)^α/2
```

The probability that such an r will not be discovered decreases exponentially following the law of $2^{-x}$. Typically, the probability that a desired r will be found before x=7, where x is the number of iterations of the WHILE loop, is about 99%.

U sends y together with $(e_1 e_2 \ldots e_k)$ to V;

V successfully compares $$f\left(y^2 \prod_{ei=1} v_{ji},m\right) \text{ and } (e_1 e_2 \ldots e_k).$$

The weakness of the known system resides in the fact that the $v_j$ (j=1,k) values are considered to be k different secret values and, therefore, forging a part of them (here 1/18, k=18), e.g. using the described signature forgery approach, compromises the security of the scheme.

SUMMARY OF THE INVENTION

It is an object of the invention to provide a method and apparatus for improving the security of an access control system. A second object of the invention is to allow the introduction of data from previous communications between user and verifier to the next ones, thereby further improving security. Another object of the invention is to provide a method for identification which enables any user to prove his identity.

The invention uses the fact that it is difficult to compute square roots mod n when factoring of n is unknown. The invention is based on the identity:

$$x^2\{r(x+x^{-1})\}^2 = r^2\{1+x^2\}^2 \bmod n \quad (1)$$

which is computed and compared using a user unit and a verifier unit. Equation (1) is difficult to solve and to imitate by an unauthorized user from only public and transmitted data. Advantageously, equation (1) can be generalized to:

$$x^e\{r(ax+bx^{-1})\}^e = r^e\{b+ax^2\}^e \bmod n \quad (2)$$

in order to increase protection and to introduce more noise into the communicated data as explained below.

The invention provides a method and apparatus for solving the above-described problems. The algorithm which requires a public directory (hereafter referred to as "host algorithm" or "host protocol") uses a modulus n which is the product of at least two large prime numbers. The known public key directory is replaced by a unique transmission of a "seed" value between an "authority", or a sender, S and a receiver R. Proper processing of the seed will provide both the identity information for R and public keys. This method is referred to as "Virtual Public Key Directory" or VPKD.

Advantageously, VPKD can be standardized and introduced to any security protocol requiring public moduli. New users can join the system without informing other users and verifiers, and without compromising the security of the system or reducing its performance. Only an authority that will provide seeds must know the factoring of n.

Typically, a VPKD will precede the host protocol. In practice this can be viewed as a preliminary secure communication that will give S public data signed by the authority. This is illustrated in FIG. 7. The evolution of knowledge between R and S is depicted in FIG. 8 for an identification system and in FIG. 5 for an access control system.

FIG. 6 explains the construction of a VPKD pre-protocol device. In order to register a new user U, the authority computes a public key $PK_U$ such that $PK_U < n$ (this restriction can be removed if $PK_U$ is sliced to the right size as is commonly done in modulo-based crypto systems) and prepares a string $ID_U$ which is unique to the physical entity U or to a given group of members and contains information such as name, address, credit card number and date of validity. This can be done by a first unit 61. A second unit 62, e.g. a memory, contains the value n. Then the center concatenates within a third unit 63 $ID_U$ and $PK_U$ with a well chosen byte c such that $ID_U \& PK_U \& c$ has a d-th root modulo n (the symbol "&" indicates concatenation).

This root is designated $g_U$ where $g_U$ is defined by $G_U = g_U^d \bmod n$ where $G_U = ID_U \& PK_U \& c$. At manufacturing $g_U$, ID and n are recorded on a retrieval medium 64. When S interacts with U, S sends $g_U$ to U which computes $G_U$ by raising $g_U$ to the power d. Next, $ID_U$ and $PK_U$ are separated and used by the host protocol. In a typical implementation, a value d=2 or d=3 may be chosen.

The described method can be generalized in various ways such as the following.

1) The order of ID, PK, and c in G can be permuted. A normalization will appear to be good in practice since the VPKD can be used by all different modulo based algorithms requiring public key transmissions.
2) Public or secret reversible functions for mixing and separating ID, PK and c can be used instead of simple concatenation, e.g. compression, permutation or even recurrent nested VPKD.
3) In schemes requiring k different public key values $PK_{U1}, PK_{U2}, PK_{U3}, \ldots, PK_{UK}$ (for each user U), which can be permuted without compromising the functionality of the scheme (concerning the known identification system where all the $v_j$ play the same role provided that for each $s_j^2 v_j = 1 \mod n$), the use of c can be avoided by permuting:

$$ID_U \& PK_{U1} \& PK_{U2} \& PK_{U3} \& \ldots \& PK_{UK} = G_{U,1};$$

$$ID_U \& PK_{U2} \& PK_{U1} \& PK_{U3} \& \ldots \& PK_{UK} = G_{U,2};$$

$$\vdots$$

$$ID_U \& PK_{Uk} \& \ldots \& PK_{U3} \& PK_{U2} \& PK_{U1} = G_{U,k!};$$

until a $G_{U,\mu}$ which is a d-th power mod n is found. The probability that an appropriate $G_{U, \mu}$ will not be found is $$(\tfrac{2}{3})^{18!} < 10^{(-ex)}, ex = 10^{14}$$

4) Checksums, random "one way" functions, CRCs (cyclic redundancy check) and other mathematical methods can be included in G (e.g. f(ID,PK) where f maps long strings to a few bytes). In systems where a group (or all entities) has the same ID (or no ID at all), ID can be eliminated or replaced by a constant. This may be applicable to pay TV systems in which it is often desirable to address groups of subscribers.

5) ID and/or the PK can be transmitted in a plain or enciphered form along with the corresponding g to improve security.

6) Simple exponentiation of g can be replaced by a polynomial computation. To provide this capability, the authority publishes a sequence of numbers $\Omega_i$ and computes $g_U$ in such a way that $$ID_U \& PK_U \& c = \sum_i g U^i \Omega_i.$$

Simplicity, security and speed aspects of the invention are enhanced through the use of microprocessor-based techniques. For example, microprocessor based apparatus embodying the invention may be incorporated into smart cards, personal computers, dongles, passports and other remote systems. These systems are useful in various applications including pay TV.

BRIEF DESCRIPTION OF THE DRAWING

The invention may be better understood by referring to the accompanying drawing, in which.

DETAILED DESCRIPTION

Satellite broadcasters are now using conditional access systems to ensure that TV programs are available only to authorized viewers, i.e. viewers who have fulfilled certain conditions such as paying required access fees. A pay TV system may be considered to include two parts. The first part is a scrambling system for processing the video signal such that the received picture is not "viewable" by unauthorized viewers. An example of a scrambling approach is a line cut and rotate method that is described in more detail below. A second part of a pay TV system is an encryption system for processing key signals needed to descramble a scrambled video signal.

Figure 1:
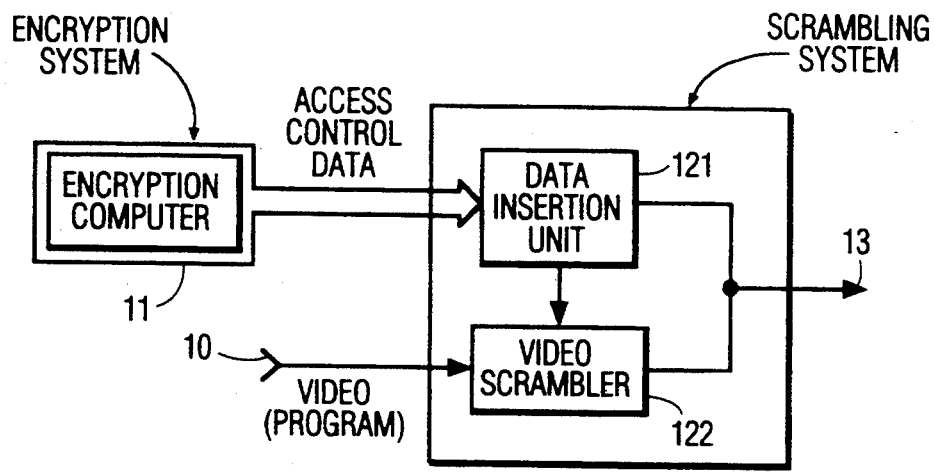
FIG. 1 shows a pay TV system with scrambling and encrypting units.
Figure 1:
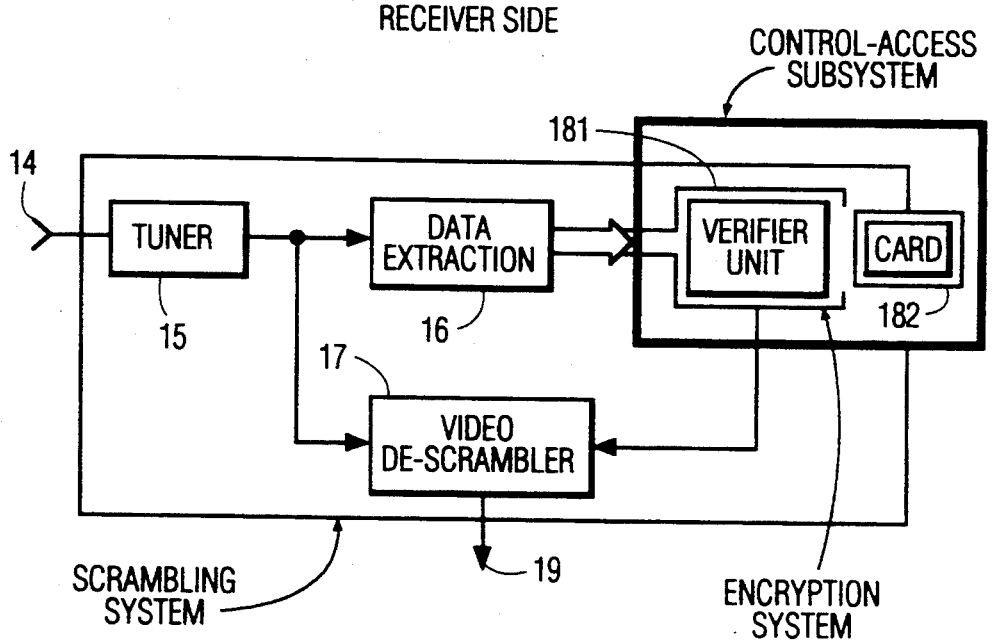

FIG. 1 shows a known pay TV system, e.g. the Videocrypt system. The incoming studio video signal 10 is scrambled in a video scrambler 122 which is controlled by a data insertion unit 121. The data insertion unit receives access control data from an encryption computer 11 and inserts data in the vertical blanking interval of the video signal which is processed by an authorized decoder to descramble the video signal. The RF modulated output signal 13 of the emitter side is the input signal 14 at the receiver side. This input signal becomes demodulated in a tuner 15 and is fed to a data extraction unit 16 and to a video descrambler 17. The access control data out of data extraction circuit 16 are evaluated in a verifier unit 181 if a smart card 182 is inserted. The output signal of the verifier unit controls the video descrambler 17.

The lines of the video signal which shall be scrambled consist of a first segment and a second segment. These two segments are separated by a cut point cp. There are, for example, 256 different cut points available within each line. A complete line may consist of 958 samples of the digitized luminance and chrominance signal, respectively.

The cut point is defined at each line by a pseudo-random binary sequence (PRBS). The two line segments then become rotated within the line, i.e. they change their position within the line. The location of cut point cp varies within the lines of each TV picture. It is the task of the descrambling system in the receiver to restore the original positions of the two segments. The encrypted data necessary to restore the segment positions may be inserted in the vertical blanking interval.

To descramble the TV signal, the decoder includes the same PRBS generator (verifier unit 181) as in the emitter (encrypting computer 11). Both generators are initialized with the same control binary sequence, e.g. a control word. The control word is changed every few seconds and transmitted in encrypted form simultaneously to all decoders.

The PRBS generator may output two 8 bit words. These words can mark the cut points cp in a luminance and in a chrominance line, respectively, as follows:

| Byte | Cut Point is at sample |
|------|------------------------|
| 0    | 224                    |
| cp   | 224 + 2 cp             |
| 255  | 734                    |

Before issuing identifiers, the authority chooses and makes public a modulus n and a power $\epsilon$ (typically $\epsilon = 2$)

to all those who might have to check identities or signatures. The center (i.e. the authority) then produces VPKD devices for all authorized members. The VPKD devices contain k small (typically between 1 and 5 bytes) public key values $PK_j$ so that each $PK_j$ has $\epsilon$-roots mod n (hereafter denoted $SK_j^{-1}$) whereby $PK_j$ is not a perfect square in N. If possible, prime $PK_j$ values must be chosen. In implementations where $\epsilon$ is not equal to 2, means for communicating $SK_j^{-2}$ to V must be found as well (VPKD, public directory, etc.). When this is done, the authority records on a retrievable medium the identifier U containing g, n, $\epsilon$ and the respective $SK_j$ values.

For a typical implementation the following values are suggested:
twenty values PK of 2 bytes each;
a 128-bit ID and a 8-byte checksum on $ID\&PK_1\&PK_2\& \ldots \&PK_{20}$;
$|n| = 512$ bits.

Optionally, one can add into the identifier any algebraic or electronic functions "a" and "b" as indicated in equation (2) above. If this is done, however, a and b must also be known to the verifiers. Advantageously, in typical small implementations (e.g. smart-cards) both a and b are constants with a value 1, but in a more powerful system (e.g. dongle) a and b can be any functions.

Figure 2:
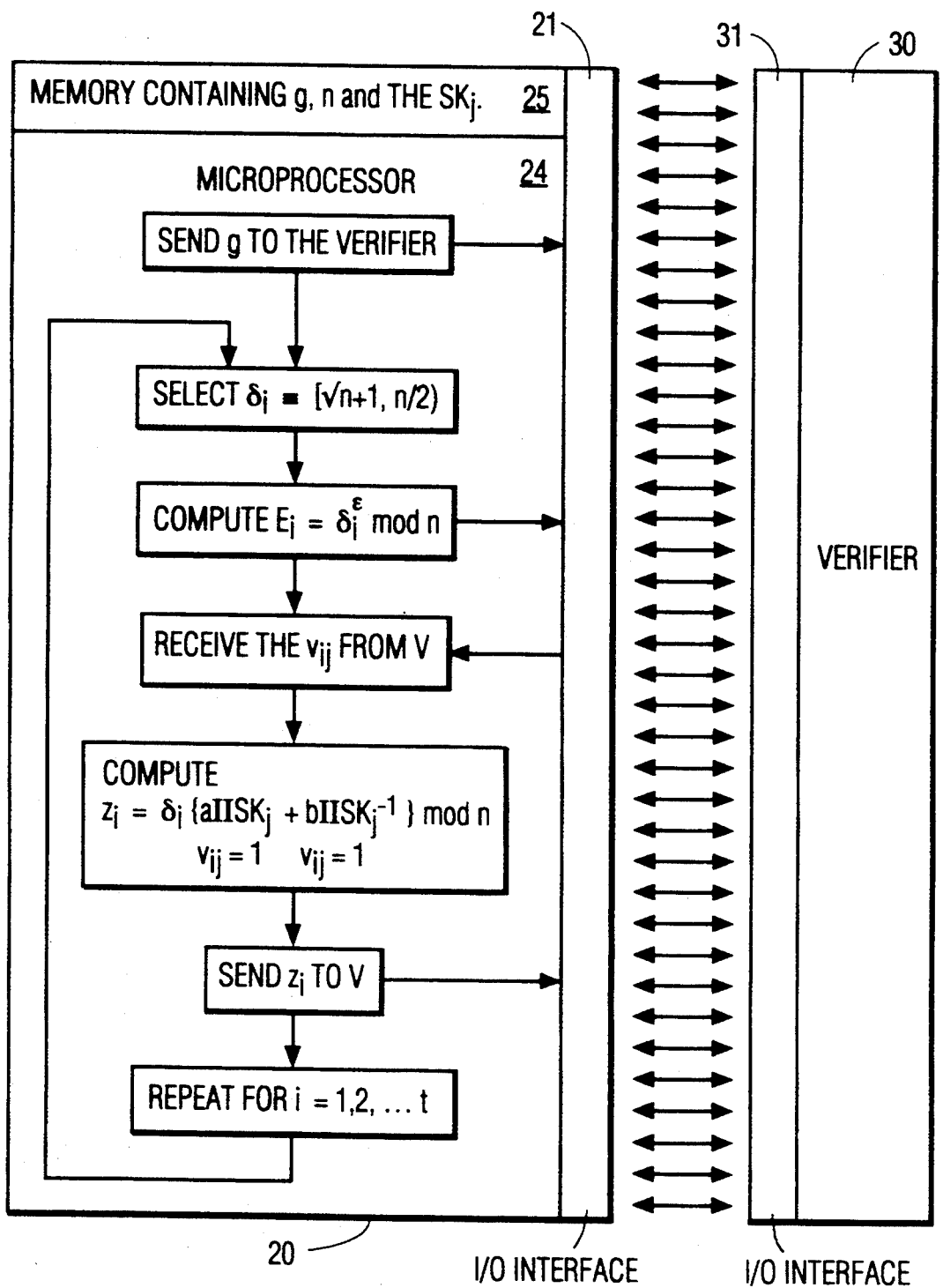
FIG. 2 shows the hardware and software structure of an identifier U (smart-card)
Figure 3:
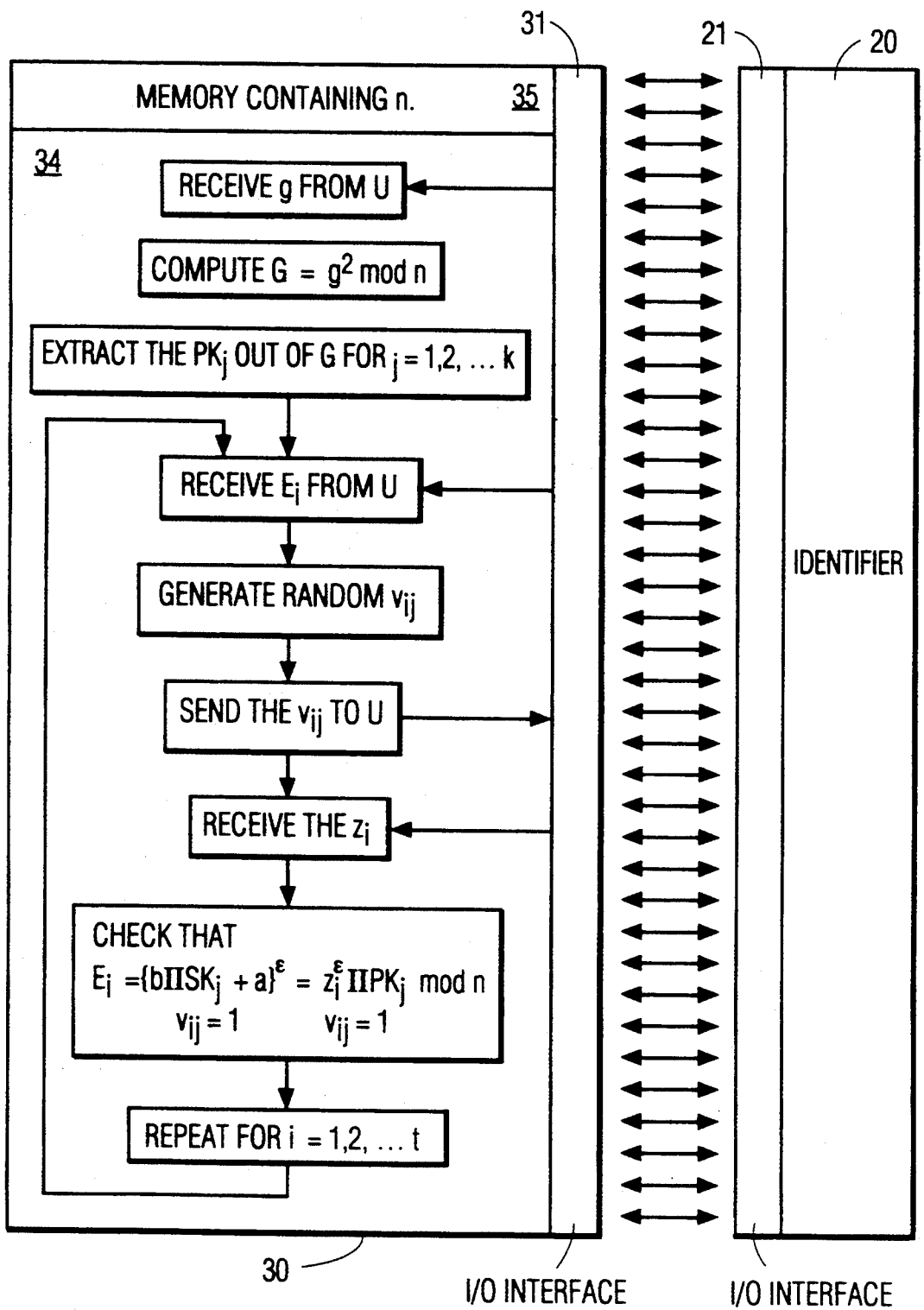
FIG. 3 shows the hardware and software structure of a verifier V.

A typical access control implementation is depicted in FIGS. 2 and 3. A smart-card 20 (i.e. the identifier U) is connected with its I/O (input/output) interface 21 to the I/O interface 31 of a verifier unit 30. Smart-card 20 contains, for example, a microprocessor 24 and a memory 25 such as a ROM (read-only memory). The memory may contain the values g, n, $SK_j$ and a program for controlling microprocessor 24. The verifier unit 30 may also contain a microprocessor 34 and a memory 35, e.g. a ROM. The verifier memory may contain the value n and a program for controlling microprocessor 34.

When the identifier interacts with the verifier, the following actions occur.

1) The identifier U sends g to V (and $SK_1^{-2}, SK_2^{-2}, \ldots, SK_k^{-2}$ if $\epsilon$ not equal to 2 and if this data is not transmitted or known to V by another way).
2) V computes $g^2$ mod n and finds $G = ID\&PK_1\&PK_2\& \ldots \&PK_k$. Then V separates ID and the PK values found in $g^2$ mod n.
3) U picks a random $\delta$ in the range $[\sqrt{n}+1, n/2)$, computes $E = \delta^\epsilon$ mod n and sends E to V.
4) V selects a random binary vector $v = (v_1 v_2 \ldots v_k)$ and sends it to U.
5) Optional—only if functions a and b are used: both V and U prepare an identical value $\Omega$ (e.g. from v, $\delta$, previously transmitted information, etc.).
6) U computes $$z = \delta \left( a(\Omega) \prod_{v_j=1} SK_j + b(\Omega) \prod_{v_j=1} SK_j^{-1} \right) \mod n.$$

and sends z to V.
7) V checks that $$E \left\{ b(\Omega) \prod_{v_j=1} SK_j^{-2} + a(\Omega) \right\}^\epsilon = z^\epsilon \prod_{v_j=1} PK_j \mod n.$$

8) Repeating steps (3) through (7) at least once.

The described protocol can be modified in various ways. For example, a variety of polynomial identities can be used instead of equation (1) above.

Figure 4:
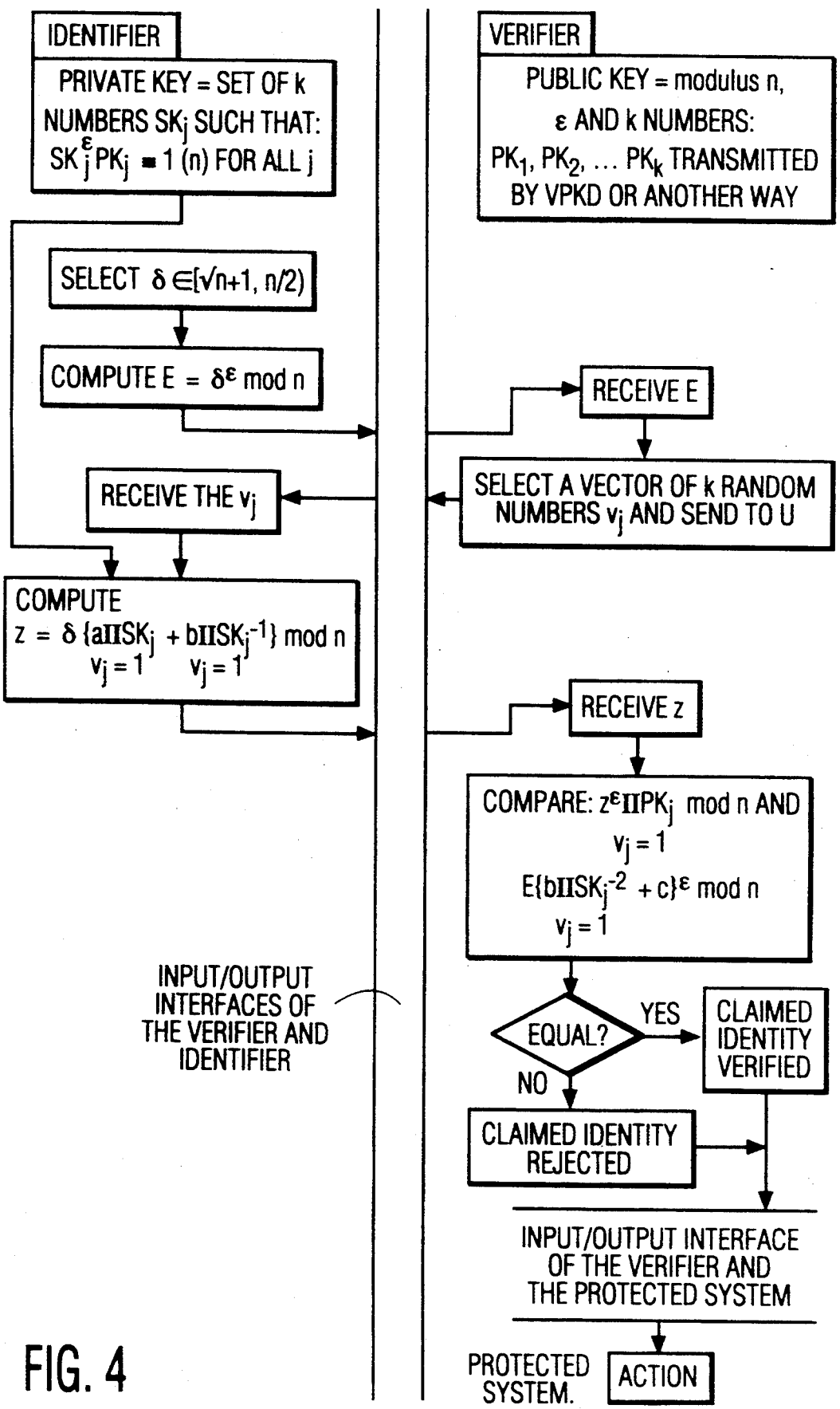
FIG. 4 shows an authentication protocol between a signer (smart card) and a verifier (identity control device) containing no secure information.
Figure 5:
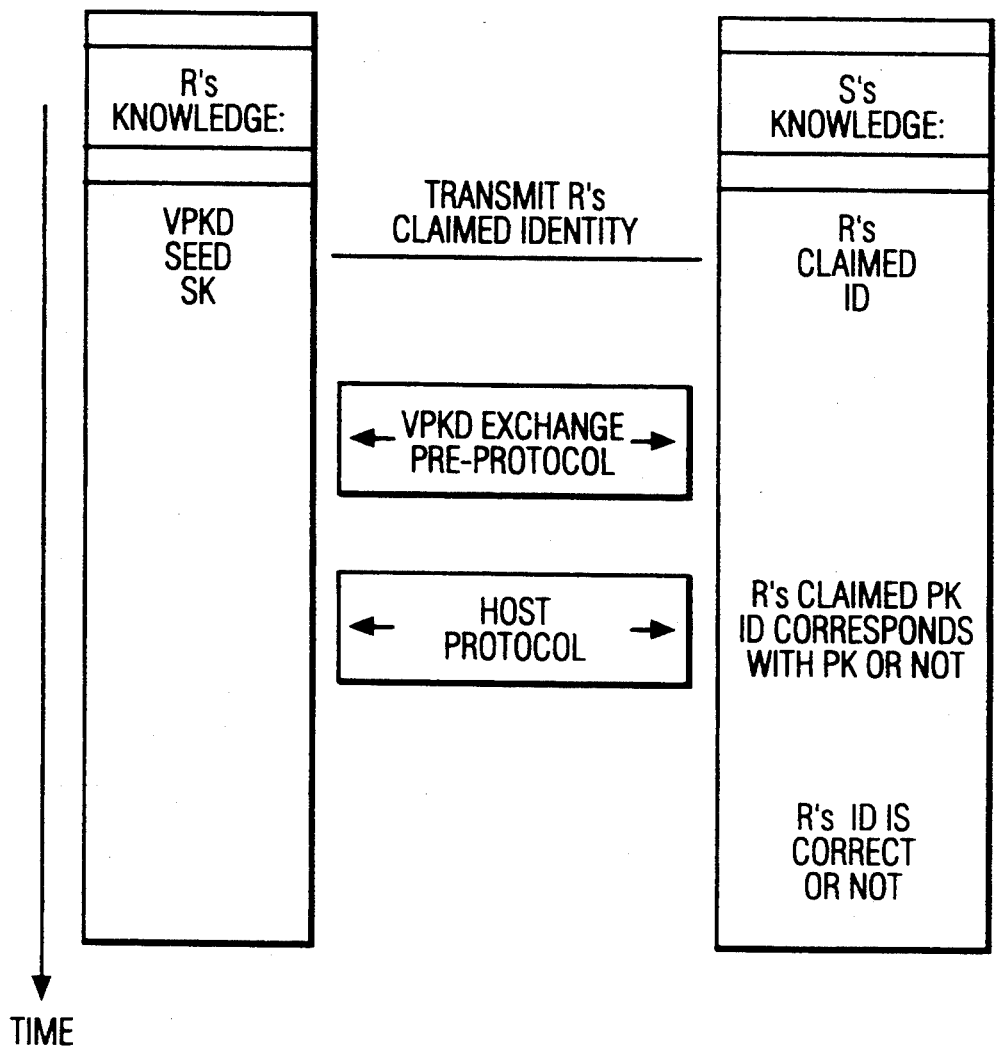
FIG. 5 illustrates a typical chronological evolution of information retained by R and S in a communication involving a VPKD pre-protocol and an access control algorithm.
Figure 6:
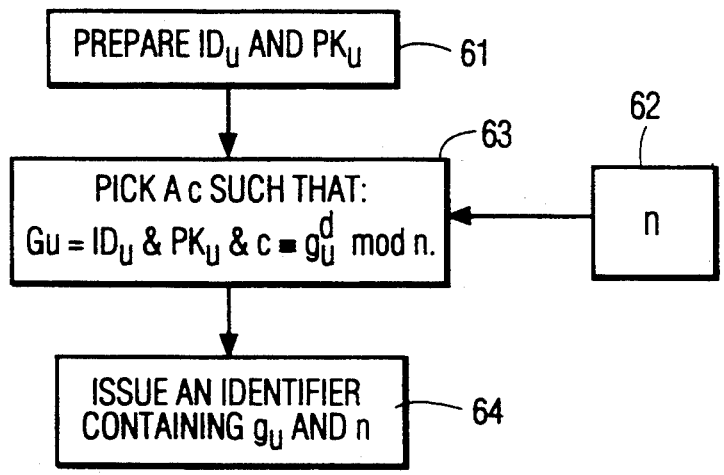
FIG. 6 shows the construction process of a VPKD pre-protocol apparatus.
Figure 7:
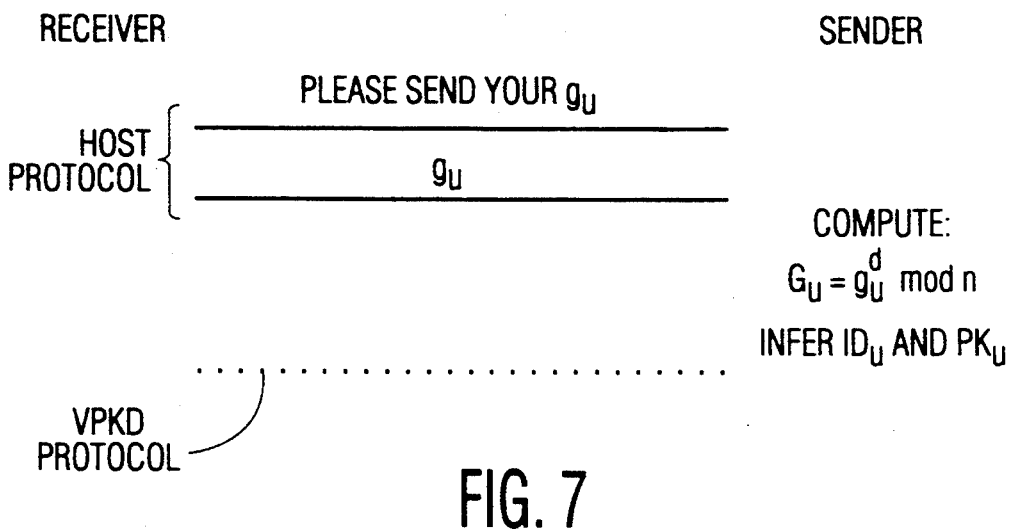
FIG. 7 shows a VPKD pre-protocol and a host protocol.
Figure 8:
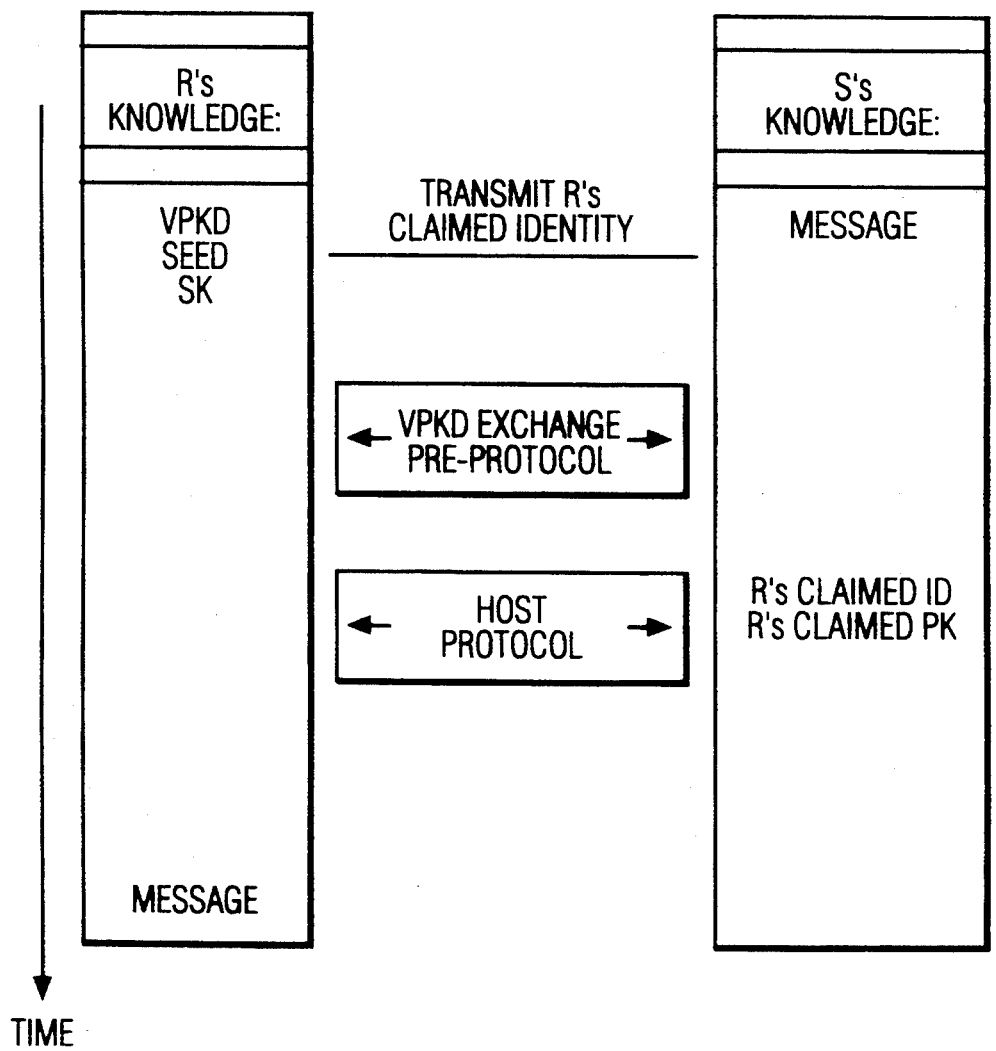
FIG. 8 illustrates a typical chronological evolution of information retained by R and S in a communication involving a VPKD pre-protocol and an identification algorithm.

FIG. 4 shows the corresponding authentication protocol.

Advantages provided by the invention include the following.
1) No pseudo random functions are needed. This requires less memory capacity (in ROM) and reduced program complexity.
2) All the public key values are computed by a unique computation that provides a substantial reduction in computation time. In comparison, known identification schemes require that k independent operations, namely f(ID,j), must be carried out.
3) The known pseudo random function f gives $v_j$ of unforseeable sizes whereas the invention provides for selecting any $(PK_j, SK_j)$ pair and, in particular, pairs where both, $SK_j$ and $PK_j$, are of small size.
4) When the known identification system is upgraded (changes in function f), all old identifiers become obsolete. This problem does not exist with systems constructed in accordance with the invention because no function f is used.

The authentication protocol, or digital signature protocol, of Fiat-Shamir that is discussed above can also be improved if additional security tests performed by the verifier are carried out after the reception of the indices $j_i$ from the prover. These security tests are that for all
$1 \leq a < b \leq k$, $j_a$ not equal $j_b$, and/or $1 \leq a < b \leq k$, $v_a$ not equal $v_b$.

I claim:
1. A method for access control for authorizing a user device, comprising the steps of:
generating in an authorizing device an identification data signal representative of identification data unique to the user device;
generating in the authorizing device an encrypted data signal including
data encrypted depending on the identification data and having been calculated mod n, where n is a product of at least two prime numbers;
providing the encrypted data signal to the user device from the authorizing device;
exchanging between the user device and a verifier device at least a portion of the encrypted data;
checking by the verifier device the validity of the data exchanged on a mod n basis; and further comprising authorizing steps performed in an initial user set-up interval including:
a) combining by the authorizing device the identification data with public key data $PK_j$ and data representative of a number c to produce data representative of a combined number G having a d-th root g mod n such that $G = g^d$ mod n, and such that each $PK_j$ has $\epsilon$ roots rood n, designated $SK_j^{-1}$;
b) storing data representative of g and n in a memory included in the user device; and further comprising verifying steps including:
c) sending data representative of g from the user device to the verifier device;

d) computing, in the verifier device, $G = g^2 \bmod n$; and separating, in the verifier device, the identification data and the public key data $PK_j$ from G;

e) selecting, in the user device, a random number $\delta$ in the range $$(\sqrt{n} + 1, n/2);$$

and computing in the user device, a value E where $E = \delta^\epsilon \bmod n$; and sending E to the verifier device;

f) selecting in the verifier device a random binary vector v where $v = (v_1 v_2 \ldots v_k)$; and sending v to the user device g) computing in the user device;

$$z = \delta \left( a \prod_{v_j=1} SK_j + b \prod_{v_j=1} SK_j^{-1} \right) \bmod n; \text{ and}$$

sending z to the verifier device;

h) checking in the verifier device to determine if:

$$E \left\{ b \prod_{v_j=1} SK_j^{-2} + a \right\}^\epsilon = z^\epsilon \prod_{v_j=1} PK_j \bmod n$$

wherein $\epsilon = 2$ or $\epsilon = 3$ and a and b are a constant, especially $a = b = 1$.

2. The method of claim 1, wherein $\epsilon > 2$ and further comprising the step of receiving in the verifier device data representative of the values $SK_j^{-2}$, especially via the user device, the values $SK_j^{-2}$ being stored in the memory included in the user device.

3. The method of claim 1, wherein in step a) the number c is omitted and the combination of ID and PK is permuted until G is a d-th power mod n.

4. The method of claim 1, wherein d has a value of $d = 2$ or $d = 3$.

5. The method of claim 1, wherein in step a) for forming G, ID and PK and/or c are combined according to ID&PK&c in which the symbol & indicates concatenation.

6. The method of claim 1, wherein the identification data ID is a constant.

7. The method of claim 1, wherein the exponentiation of g is replaced by a polynomial computation such that the authority uses a sequence of public numbers $\Omega_i$ and computes g such that $$(ID_U \& PK_U \& c) = \sum_i g^i \Omega_i.$$

8. The method of claim 1 wherein a and b are algebraic or electronic functions.

9. The method of claim 1 wherein the number n is a binary number having a number of bits in the range 450 to 570.

10. The method of claim 1, wherein the user device and the verifier device generate a value $\Omega$ from the random binary vector v and/or from the random number $\delta$ and/or from data and/or numbers resulting from previous calculations, and wherein steps g) and h) are modified to:

g) computing in the user device $$z = \delta \left( a(\Omega) \prod_{v_j=1} SK_j + b(\Omega) \prod_{v_j=1} SK_j^{-1} \right) \bmod n; \text{ and}$$

sending z to the verifier device;

h) checking in the verifier device to determine if:

$$E \left\{ b(\Omega) \prod_{v_j=1} SK_j^{-2} + a(\Omega) \right\}^\epsilon = z^\epsilon \prod_{v_j=1} PK_j \bmod n.$$

11. The method of claim 1, wherein steps e) to h) are repeated t times with different random binary vectors v and/or random numbers $\delta$, t greater than or equal to 1.

12. The method of 11, wherein t has a value of at least $t = 4$.

13. The method of claim 1, wherein a set of at least $k = 18$ key values PKj is used.

14. The method of claim 11, wherein the product k*t has a value in the range of 64 to 80.

15. The method according to claim 1 wherein steps e) to h) are carried out using binary or trinary logic signals.

16. In an access control system or identification system, a user device which has been authorized by an authorizing device having calculated identification data ID unique to the user device and having provided the user device with encrypted data depending on the identification data ID which are calculated mod n, wherein for verifying the identity of the user device, the user device exchanges at least a part of the encrypted data with a verifier device which checks the validity of the data exchanged on a mod n basis, n being a product of at least two prime numbers, and wherein the identification data ID are combined with a public key data $PK_j$ and data representative of a number c to provide data representative of a combined number G having a d-th root g mod n according to $G = g^d \bmod n$, and wherein each data value $PK_j$ has $\epsilon$-roots mod n designated $SK_j^{-1}$, the user device comprising:

memory means for storing data representative of g and n;

means for calculating; and interface means for exchanging data between the verifier device and the user device; wherein for verifying:

i) the user device sends, via the interface means, data representative of g to the verifier device;

j) the user device selects a random number $\delta$ in the range $$(\sqrt{n} + 1, n/2),$$

and computes in the calculating means a value $E = \delta^\epsilon \bmod n$, and sends via the interface means data representative of value E to the verifier device;

k) the user device receives from the verifier device via the interface means data representative of a random binary vector $v = (v_1 v_2 \ldots v_k)$;

l) the user device computes in the calculating means $$z = \delta \left( a \prod_{v_j=1} SK_j + b \prod_{v_j=1} SK_j^{-1} \right) \bmod n; \text{ and}$$

sends data representative of z via the interface means to the verifier device, wherein $\epsilon=2$ or $\epsilon=3$ and a and b are a constant, especially $a=b=1$.

17. Apparatus according to claim 16, wherein the number n is a binary number and the number of bits in n is in the range 450 to 570.

18. Apparatus according to claim 16, wherein steps j) to l) are repeated t times with different random binary vectors v and/or random numbers δ, t greater than or equal to 1.

19. Apparatus according to claim 18, wherein t has a value of at least $t=4$.

20. Apparatus according to claim 16, wherein steps j) to l) are carried out using binary or trinary logic signals.

21. In a system for access control or identification, a verifier device which verifies the identity of a user device which has been authorized by an authorizing device, the authorizing device having calculated identification data ID unique to the user device, and having provided the user device with encrypted data depending on the identification data ID which are calculated mod n, wherein the verifier device and the user device exchange at least a part of the encrypted data and check the validity of the data exchanged on a mod n basis, wherein n is a product of at least two prime numbers, and wherein the identification data ID are combined with data representative of a public key $PK_j$ and data representative of a number c to provide data representative of a combined number G having a d-th root g mod n such that $G=g^d \bmod n$, and wherein each $PK_j$ has $\epsilon$-roots mod n designated $SK_j^{-1}$, the verifier device comprising:

memory means for storing data representative of the value n;
  means for calculating; and
  interface means for exchanging data between the verifier device and the user device; wherein for verifying:
  m) the verifier device receives data representative of g via the interface means from the user device and, in the calculating means, computes $G=g^2 \bmod n$ and separates from G the identification data ID and the public key data values $PK_j$;

n) the verifier device receives data representative of a value $E=\delta^\epsilon \bmod n$ from the user device via the interface means, and selects a random binary vector $v=(v_1 v_2 \ldots v_k)$ and sends data representative of v to the user device via the interface means;

o) the verifier device receives data representative of the value z from the user device via the interface means where $$z = \delta \left( a \prod_{v_j=1} SK_j + b \prod_{v_j=1} SK_j^{-1} \right) \bmod n;$$

and
p) the verifier device checks to determine if $$E \left( b \prod_{v_j=1} SK_j^{-2} + a \right)^\epsilon = z^\epsilon \prod_{v_j=1} PK_j \bmod n$$

wherein $\epsilon=2$ or $\epsilon=3$ and a and b are a constant, especially $a=b=1$.

22. Apparatus according to claim 21, wherein the number n is a binary number and the number of bits in n is in the range 450 to 570.

23. Apparatus according to claim 21, wherein steps n) to o) are repeated t times with different random binary vectors v and/or random numbers δ, t greater than or equal to 1.

24. Apparatus according to claim 23, wherein t has a value of at least $t=4$.

25. Apparatus according to claim 21, wherein steps n) to o) are carried out using binary or trinary logic signals.

26. The method of claim 1 wherein the user device comprises a smart card and the verifier device comprises a smart card reader.

27. The user device of claim 16 wherein the user device comprises a smart card, the smart card includes the interface means for coupling the smart card to the verifier device, and the verifier device comprises a smart card reader.

28. The verifier device of claim 21 wherein the verifier device comprises a smart card reader, the smart card reader includes the interface means for coupling the smart card reader to the user device, and the user device comprises a smart card.

* * * * *